United States Patent
Su

(10) Patent No.: US 9,437,203 B2
(45) Date of Patent: Sep. 6, 2016

(54) ERROR CONCEALMENT FOR SPEECH DECODER

(71) Applicant: Huan-Yu Su, Irvine, CA (US)

(72) Inventor: Huan-Yu Su, Irvine, CA (US)

(73) Assignee: QOSOUND, INC., Irvine, CA (US)

( * ) Notice: Subject to any disclaimer, the term of this patent is extended or adjusted under 35 U.S.C. 154(b) by 0 days.

(21) Appl. No.: 14/193,606

(22) Filed: Feb. 28, 2014

(65) Prior Publication Data

US 2014/0257800 A1  Sep. 11, 2014

Related U.S. Application Data

(60) Provisional application No. 61/774,511, filed on Mar. 7, 2013.

(51) Int. Cl.
| | |
|---|---|
| *G10L 19/02* | (2013.01) |
| *G10L 19/005* | (2013.01) |
| *H04L 1/20* | (2006.01) |
| *H04L 1/00* | (2006.01) |

(52) U.S. Cl.
CPC ......... *G10L 19/0208* (2013.01); *G10L 19/005* (2013.01); *H04L 1/203* (2013.01); *H04L 1/0036* (2013.01)

(58) Field of Classification Search
CPC .................... G10L 19/005; G10L 21/0208
See application file for complete search history.

(56) References Cited

U.S. PATENT DOCUMENTS

| | | | | |
|---|---|---|---|---|
| 5,673,210 | A * | 9/1997 | Etter ................ | G11B 20/1876 702/69 |
| 8,024,192 | B2 * | 9/2011 | Zopf et al. ................ | 704/267 |
| 2003/0069018 | A1 * | 4/2003 | Matta et al. ................ | 455/436 |
| 2004/0010407 | A1 * | 1/2004 | Kovesi et al. ............. | 704/219 |
| 2006/0265216 | A1 * | 11/2006 | Chen ........................ | 704/228 |
| 2006/0271373 | A1 * | 11/2006 | Khalil et al. .............. | 704/500 |
| 2008/0133242 | A1 * | 6/2008 | Sung et al. ................ | 704/262 |
| 2008/0243495 | A1 * | 10/2008 | Anandakumar et al. .. | 704/214 |
| 2009/0070107 | A1 * | 3/2009 | Kawashima et al. ..... | 704/229 |
| 2009/0276212 | A1 * | 11/2009 | Khalil et al. .............. | 704/226 |
| 2011/0125505 | A1 * | 5/2011 | Vaillancourt et al. .... | 704/500 |
| 2011/0196673 | A1 * | 8/2011 | Sharma ............. | G10L 19/005 704/207 |
| 2013/0166294 | A1 * | 6/2013 | Cox et al. ................. | 704/238 |
| 2014/0235192 | A1 * | 8/2014 | Purnhagen et al. ....... | 455/296 |

OTHER PUBLICATIONS

Ramjee, R.; Kurose, J.; Towsley, D.; Schulzrinne, Henning, "Adaptive playout mechanisms for packetized audio applications in wide-area networks," INFOCOM '94. Networking for Global Communications., 13th Proceedings IEEE , vol., No., pp. 680,688 vol. 2, Jun. 12-16, 1994.*

* cited by examiner

*Primary Examiner* — Douglas Godbold
(74) *Attorney, Agent, or Firm* — Keith Kind

(57) ABSTRACT

Provided is a system, method, and computer program product for improving the quality of speech reproduction in wireless applications where the received speech frames are subject to transmission and packet losses. The speech decoding process is dynamically delayed by at least one frame period in order to perform additional error correction and concealment techniques during times when the wireless link quality if below a predetermined threshold. The wireless link is monitored and if the link quality falls below a predetermined threshold, the decoding process is delayed by at least one frame period so that one or more error correcting techniques can be performed to increase the quality of the reconstructed speech.

22 Claims, 8 Drawing Sheets

ERROR CONCEALMENT FOR SPEECH DECODER

CROSS REFERENCE TO OTHER APPLICATIONS

The present application for patent claims priority to Provisional Application No. 61/774,511 entitled "ERROR CONCEALMENT FOR SPEECH DECODER" filed on Mar. 7, 2013, by Huan-yu Su. The above referenced provisional patent application is hereby incorporated herein by reference as if set forth in full.

FIELD OF THE INVENTION

The present invention is related to audio signal processing and more specifically to system and method for improving the audio quality of wireless voice communications.

BACKGROUND OF THE INVENTION

The improved quality of voice communications over mobile telephone networks have contributed significantly to the growth of the wireless industry over the past two decades. Due to the interactive nature of live voice conversations, mobile telephone calls carrying such conversations require extremely low end-to-end (or mouth-to-ear) delays or latency. Compressed speech packets, referred to as speech frames, are typically received about once every 20 ms by the receiver in a typical mobile phone system. It is an industry standard approach for the decoder in such systems to decode each speech frame immediately and as quickly as possible, so that the reconstructed speech signal can be played out to the loudspeaker with little or no perceived delay.

One method used to improve the quality of the voice communications is a commonly known technique referred to as error concealment. In very simple terms, error concealment techniques are employed when a speech frame is not received, or it is received, but contains errors. These techniques attempt to conceal, mask or cover-up such errors by replacing the missing speech content with synthetic content in order to produce a more contiguous and pleasant listening experience for the user.

It is well known that the need to reduce the amount of end-to-end latency in a voice call is always at odds with quality enhancement techniques, such as error concealment and the like, due to the fact that there is simply very little time available to adequately employ such techniques. Accordingly, there is a intense need for an improved system and method to enhance the quality of wireless calls that require low end-to-end latency.

BRIEF SUMMARY OF THE INVENTION

The present invention provides a system and method for improving error concealment techniques and the like, in wireless communications systems that generally require and are designed to implement very low end-to-end latency. In traditional systems, maintaining the lowest possible latency for a given speech coding standard is of utmost importance. The present invention challenges this well known approach in certain circumstances, where it's advantageous to trade-off low latency for improved error correction. It is advantageous, in some application scenarios, such as the presence of a poor link quality, to accept increases in latency in order to improve the quality of the speech signal.

From a mobile phone user's perspective, the mouth-to-ear low latency requirements remain extremely important. This is especially true when the wireless link quality is high and interactive, high quality voice exchanges are possible. But when the wireless link quality deteriorates below a certain threshold, and the user can barely carry on a conversation, trading off latency for an improved voice quality is the preferred method in accordance with the present invention. The longer latency for the most part, only effects the interactivity of the conversations. That is, the negative effects of a longer latency typically manifests itself by making it more difficult for one party to interrupt while the other party is still speaking. In contrast, a very poor signal quality can be significantly more devastating as it often makes it impossible to carry on a conversation altogether and necessitates early termination of the call.

Under such circumstances, the present invention provides that the decoder take additional time to receive further voice packets in order to improve error concealment techniques and produce a significant increase in the voice quality of the call to compensate for the poor link quality. In general, when a speech frame is received in error, the decoder uses an error concealment technique to minimize the impact to the voice quality. Due to traditional latency constraints, such error concealment techniques are typically based on predicting the missing frames, or more precisely the frames in error, by using information from the most recent frames that were correctly received.

This technique works well, if the missing speech frame happens in the middle of a relatively slow time-varying period, such as during a vowel or a consonant sound, or during a background noise portion of the signal, where the speech signal is not rapidly changing. Such error concealment techniques can indeed mitigate most of the audible degradations and reproduce acceptable substitutes to the missing speech. Unfortunately, well behaved slow time-varying speech periods form only a small percentage of a typical voice conversation, leaving a large majority of the speech subject to a poor error concealment, and major QoE degradations.

Accordingly, the present invention employs a novel approach to trade-off low end-to-end latency in favor of improved error concealment in certain circumstances. In one embodiment, the present invention provides an improved error concealment technique that dynamically delays the decoder by one or more speech frames during a detected poor wireless link quality period, in order to allow the decoder to receive subsequent speech frames, after a missing frame, so that better error concealment techniques can be implemented. This technique not only relies on past information, but also takes advantage of the newer information contained in future frame(s).

In another embodiment, the present invention provides an improved error concealment technique that preemptively delays the decoder by one or more speech frames during an anticipated poor wireless link quality period in order to allow the decoder to receive subsequent speech frames, after a missing frame, so that better error concealments can be implemented.

In one embodiment of the present invention, a link quality monitor is implemented in a mobile phone receiver that provides an indication about the transmission error rate the user is experiencing. If it is determined that the user is or is likely to experience a higher than normal error rate, then a delay adjustment module increases the delay, and an improved speech decoder will use not only the past information, but also the newer speech packets in order to output a better reconstructed speech for a missing speech frame. However, if the link monitor indicates that the link quality is high, or more precisely that the user is likely not to experience higher than normal error rate, then the delay adjustment module adjusts the latency back to the normal position so that the standardized speech decoder is used to maintain the shortest possible end-to-end latency.

DETAILED DESCRIPTION

The present invention may be described herein in terms of functional block components and various processing steps. It should be appreciated that such functional blocks may be realized by any number of hardware components or software elements configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data and voice transmission protocols, and that the system described herein is merely one exemplary application for the invention.

It should be appreciated that the particular implementations shown and described herein are illustrative of the invention and its best mode and are not intended to otherwise limit the scope of the present invention in any way. Indeed, for the sake of brevity, conventional techniques for signal processing, data transmission, signaling, packet-based transmission, network control, and other functional aspects of the systems (and components of the individual operating components of the systems) may not be described in detail herein, but are readily known by skilled practitioners in the relevant arts. Furthermore, the connecting lines shown in the various figures contained herein are intended to represent exemplary functional relationships and/or physical couplings between the various elements. It should be noted that many alternative or additional functional relationships or physical connections may be present in a practical communication system. It should be noted that the present invention is described in terms of a typical mobile phone system. However, the present invention can be used with any type of communication device including non-mobile phone systems, laptop computers, tablets, game systems, desktop computers, personal digital infotainment devices and the like. Indeed, the present invention can be used with any system that supports digital voice communications. Therefore, the use of cellular mobile phones as example implementations should not be construed to limit the scope and breadth of the present invention.

Figure 1:
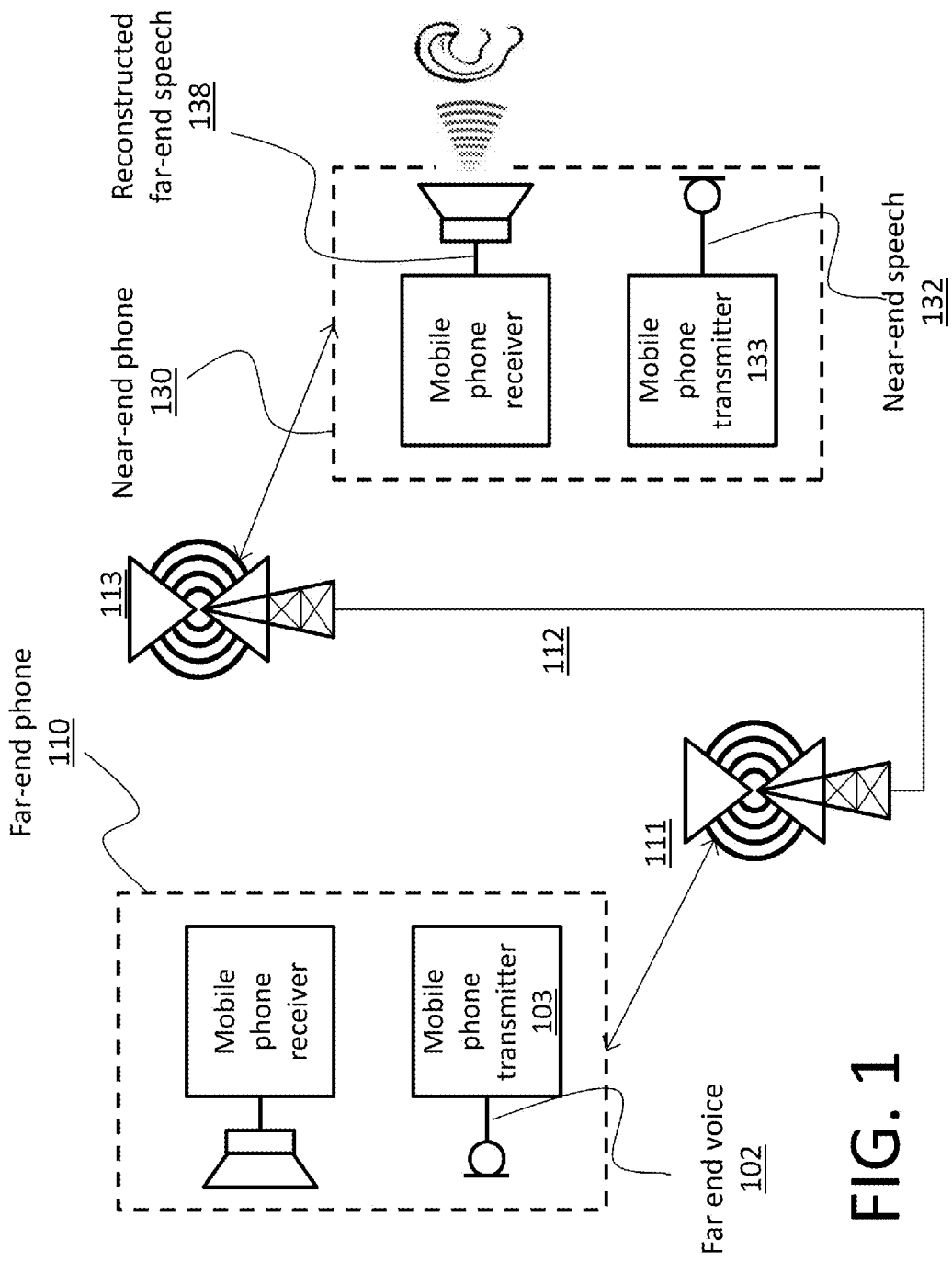
FIG. 1 is an exemplary schematic block diagram representation of a mobile phone communication system in which various aspects of the present invention may be implemented.

FIG. 1 illustrates a typical mobile phone system where two mobile phones, 110 and 130, are coupled together via a certain wireless and wireline connectivity systems between them as illustrated by elements 111, 112 and 113. When the far end talker speaks into the microphone, the speech signal is picked up by the far-end microphone that produces a far-end speech signal 102. The speech signal 102 is then received by the far-end mobile phone transmitter 103, which applies certain compression schemes and transmits the compressed (or coded) speech signal in the form of a packet to the near-end mobile phone 130, via the wireless/wireline connectivity systems 111, 112 and 113, in accordance to whatever wireless standards that both mobile phones and the wireless access/transport system needs to support. Once received by the near-end mobile phone 130, the compressed speech packet is converted back to its linear form called reconstructed far-end speech (or simply far-end speech) 138 before being played back through a loudspeaker or earphone.

Due to the coexistence of multiple wireless standards in the market place, it is entirely possible that the two mobile phones 110 and 130 involved in a conversation use different wireless standards and different speech coder standards. For example, one mobile phone 110 may use the W-CDMA wireless standard and the corresponding AMR-NB speech coder standard, while the other mobile phone 130 may use the cdma2000 wireless standard and the corresponding EVRC-B speech coder standard. In such connections, the compressed speech signal packet from mobile phone 110 will be converted into a common format within the network, usually at the base-station 111 or in the core network represented by 112. An example of a common speech coder format is PCM also referred to as the G.711 standard. Finally, the speech signal is recompressed at the base-station 113, using the speech coding standard implemented by the mobile phone 130. While the details of this necessary compression format conversion might vary, it does not change the scope of the present invention.

Figure 2:
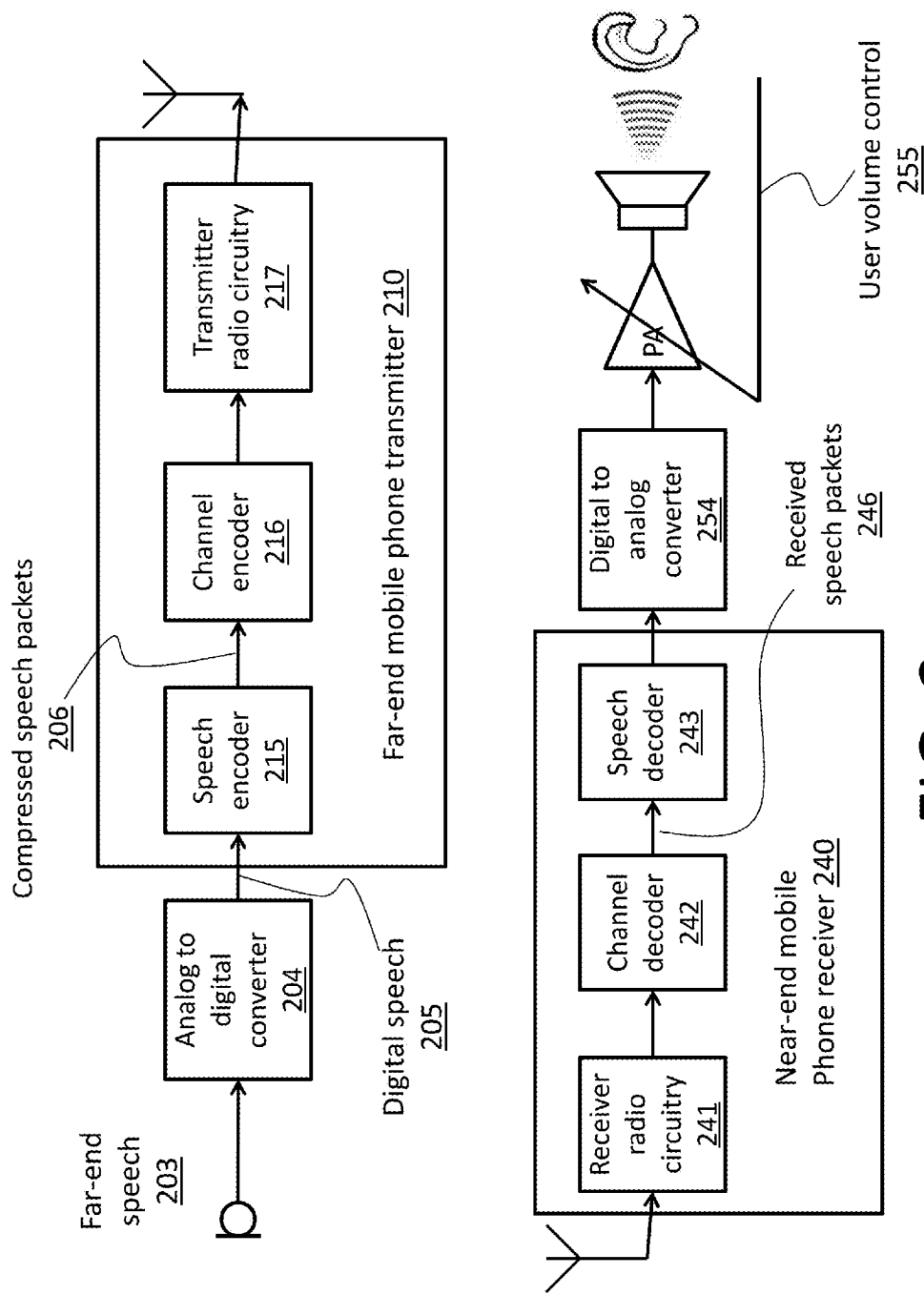
FIG. 2 highlights in more detail exemplary flowcharts of speech transmitter and receiver of a mobile phone communication system.

FIG. 2 is a flow diagram further detailing the relevant processing units comprising the far-end mobile phone transmitter and the near-end mobile phone receiver. The far-end speech 203 first goes through an analog to digital convertor 204 that produces a digital form of the far-end speech 205. The digital speech 205, is then compressed by the speech encoder 215, according to a certain wireless speech coding standard. Next, the compressed speech packets 206 are sent through the channel encoder 216, before being transmitted over the air through the far-end phone's antenna via the transmitter radio circuitry 217.

On the near-end phone shown at the bottom of FIG. 2, the reverse process takes place. The radio signal containing the compressed speech packet arrives at the near-end phone's antenna coupled to the receiver radio circuitry 241. It is then processed through the channel decoder 242, which outputs the received received speech packets or speech frames 246.

Depending on the speech coding scheme used, one compressed speech packet can typically represent 5-30 ms worth of speech signal.

Due to the continuing evolution of wireless access technology, it is noted that that the combination of the channel encoder 216 and transmitter radio circuitry 217, as well as the reverse processing of receiver radio circuitry 241 and channel decoder 242, can be seen as wireless modem in this example in FIG. 2. However, many new standards, such as LTE, WiMax or WiFi define the wireless modem quite differently than the form described in FIG. 2. That is, many other configurations are possible other than the exemplary configurations shown in the figures, including the integration of many modules into a single module, or the separation of certain functional components into additional or different modules, or many other combinations thereof. Accordingly, the modules used to describe functional components of the systems used to implement the example embodiments of the present invention are for exemplary purposes only and any differences in such configurations do not depart from the scope and breadth of the present invention.

Figure 3:
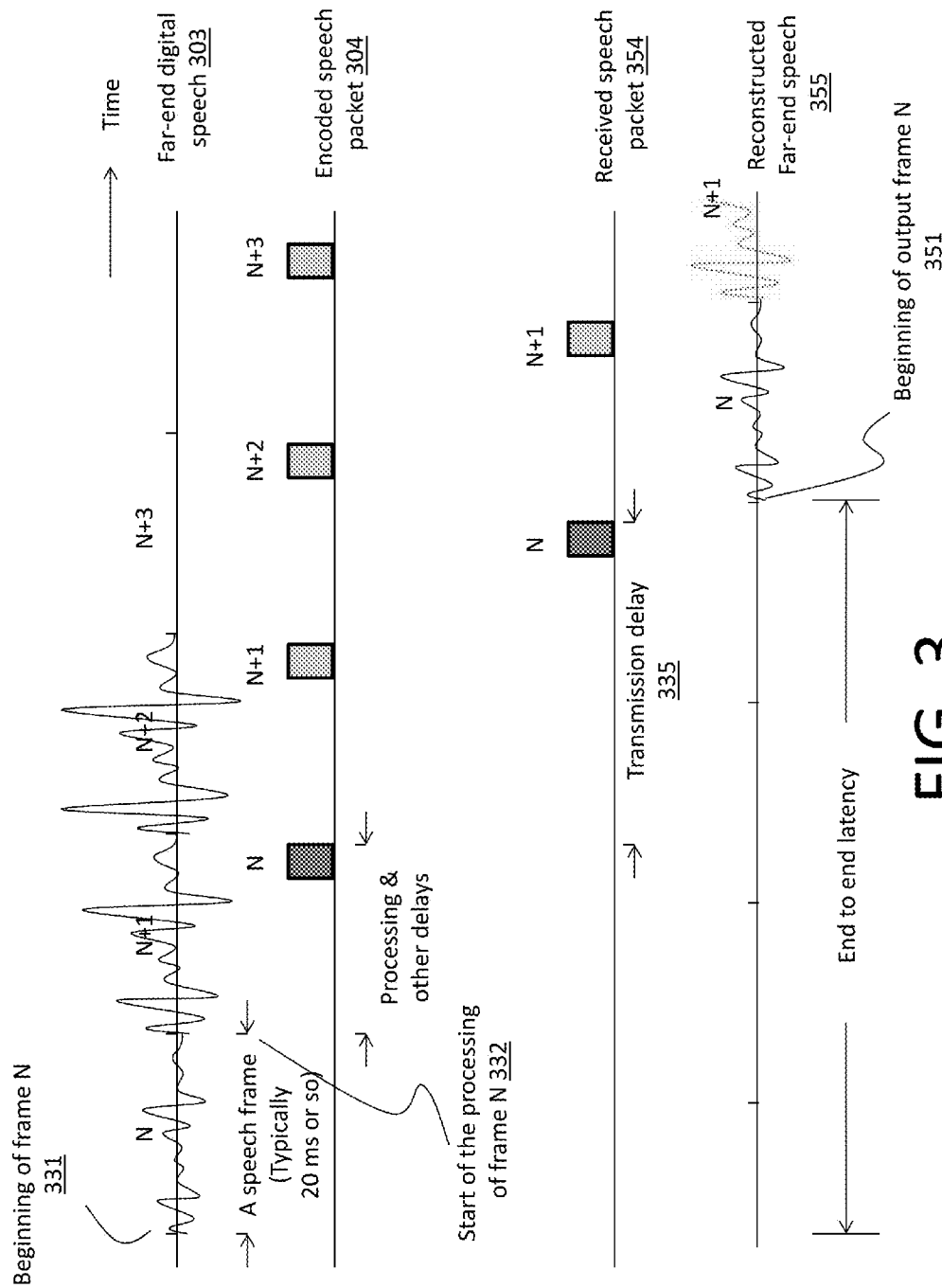
FIG. 3 illustrates the typical mouth-to-ear latency breakdown in a mobile communication system.

Referring now to FIG. 3, where, for simplicity, it is assumed that both mobile phones are using the same speech coding standard, and as such, there is no requirement for additional format conversion steps in the intermediate connections between the sending and receiving mobile units, as described above.

At the beginning of the processing frame N (or more precisely the first speech sample in frame N) 331, the speech encoder collects a frame worth of the far-end digital speech samples 303. Depending on the speech coding standard used, this sample collection time is equal to the processing frame size in time. When the sample collection is complete for the processing frame N, the encoding of the frame N starts as shown at 332. The encoding process takes some time because typical commercial implementations of the speech encoder employ the use of either digital signal processors (DSPs), embedded circuitry or other types of processors such as general purpose programmable processors, all with finite processing capabilities. In addition, different speech coding standards may have some small, but non-zero, so-called look-ahead latency. At the completion of the speech encoding process, the encoded speech packet 304 is ready for transmission via the wireless modem of the far-end mobile phone 210.

As previously stated, the encoded speech packet will go through a variable number of steps before it is received at the near-end mobile phone. For simplicity and without changing the scope of the present invention, the time it takes can be thought of as a single time period that is referred to herein as the "transmission delay" 335. Once received, the speech decoder uses information contained in the received speech packet 354 to reconstruct the far-end speech 355, which also takes some non-zero processing time before the first speech sample 351 in the frame N can be sent to the loudspeaker for output. The total end-to-end latency (or mouth-to-ear delay) is the time elapsed from the moment the first sample in the frame N becomes available at the far-end mobile phone, to the time when the first corresponding sample is played out at the near-end phone.

As stated previously, a long end-to-end latency will impair a user's ability to engage in interactive conversations. Most notably, it will be difficult for one user to interrupt the other party when necessary. As such, it has been part of the standard that the speech decoder will reconstruct the speech frame whenever the speech packet is received at the near-end phone. From FIG. 3 it also shows that this practice indeed results in the shortest possible end-to-end latency.

Unfortunately, wireless transmission is subject to a variety of link quality degradations caused by things like multipath, fading, shadowing due to large buildings, vehicle speed at which the user is traveling, distance from the cell-site, interference from other users nearby, etc. When the link quality is high and transmission loss rate is negligible, the normal reconstructed far-end speech 355 is very close to the original speech, resulting in very good voice quality. Under such favorable link conditions, maintaining a low mouth-to-ear latency is preferred.

Figure 4:
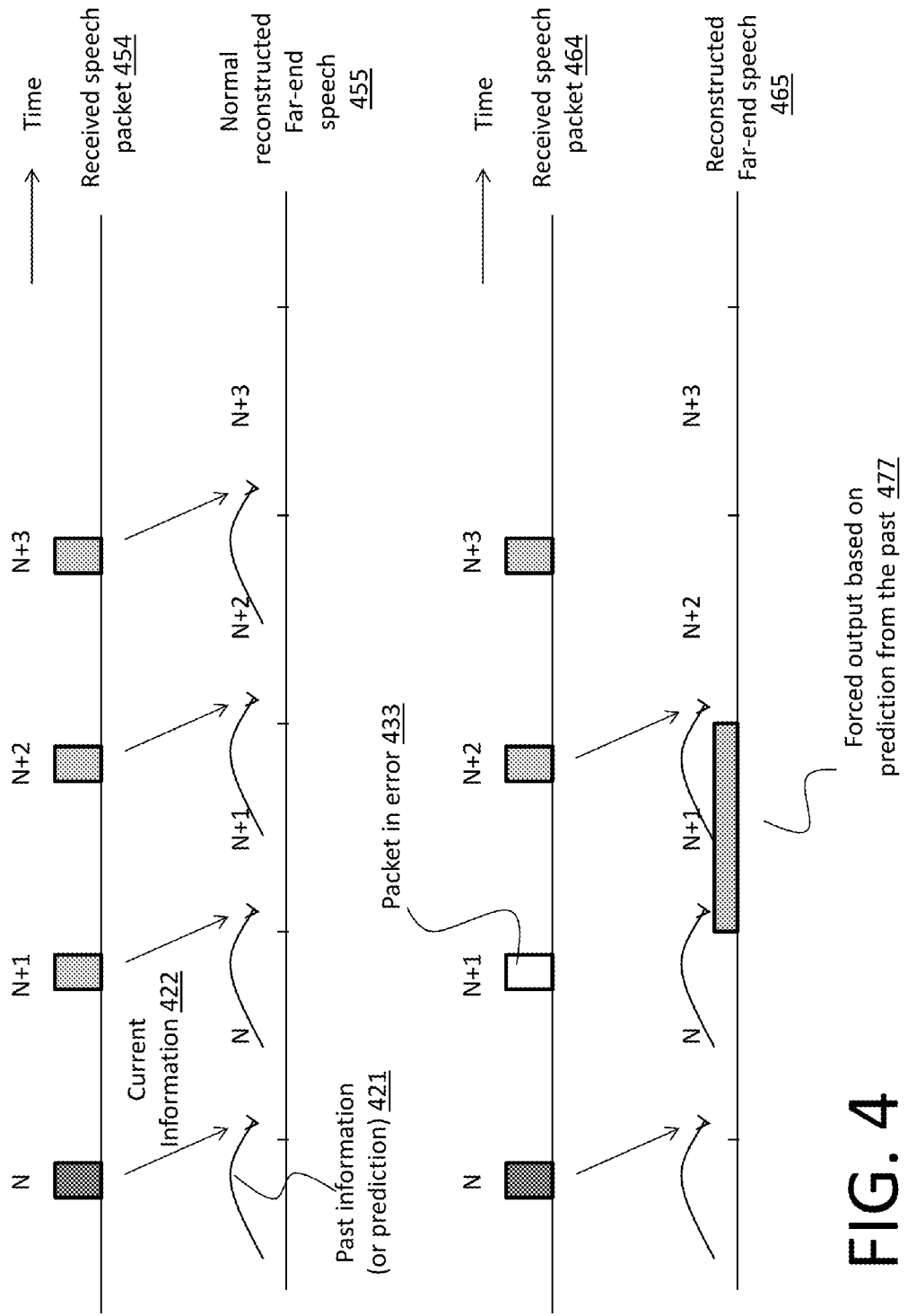
FIG. 4 illustrates the information used to generate reconstructed speech, without or with transmission error.
Figure 5:
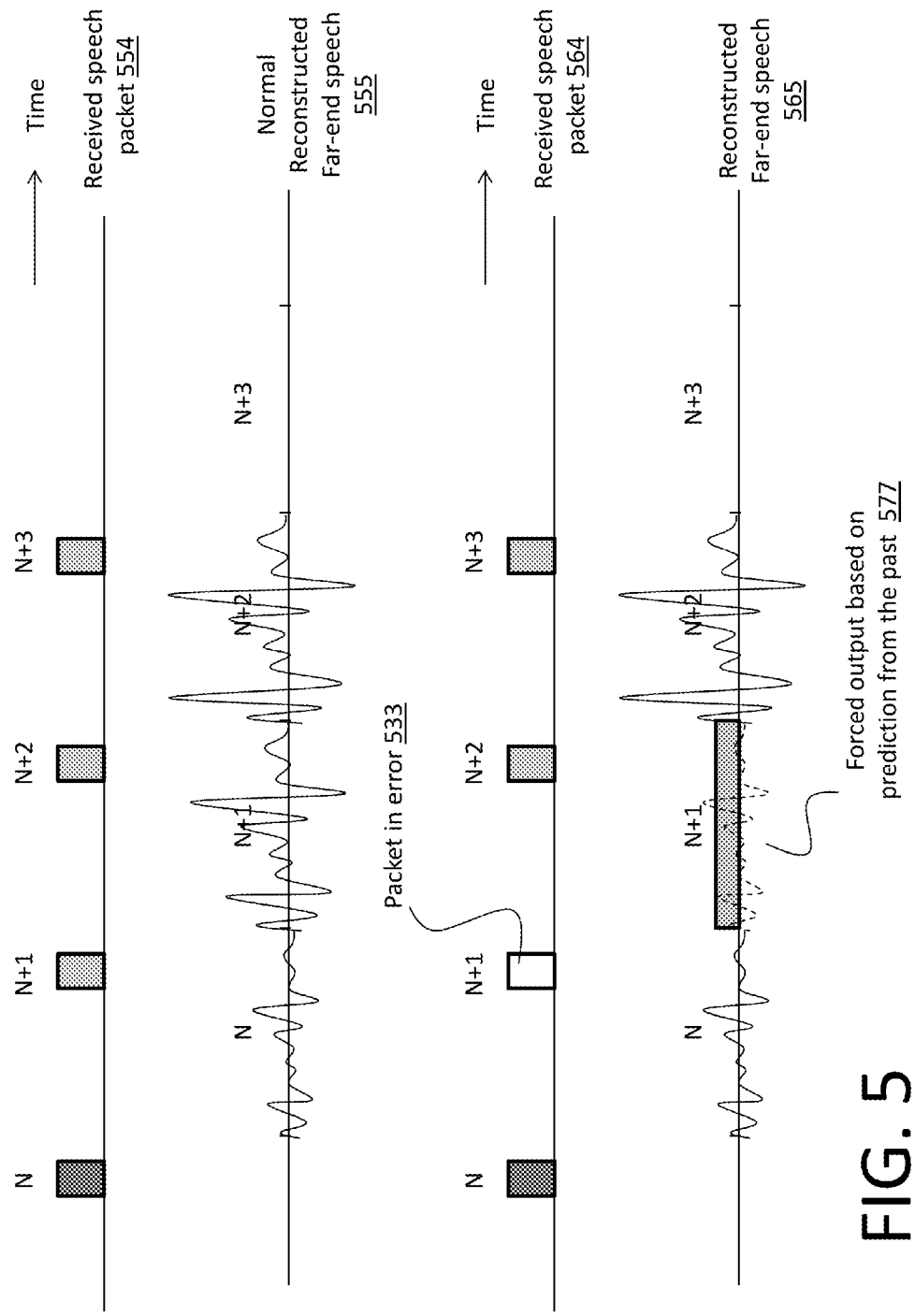
FIG. 5 shows an example of the output of a typical prediction based error concealment technique vs. the reconstructed speech without transmission error.

However, when transmission loss rate starts to increase due to link quality deterioration, some speech packets will arrive at the near-end phone with errors as shown in 433 and 533 in FIGS. 4 and 5, respectively, rendering them not suitable for regenerating far-end speech.

FIG. 4 illustrates an example of the information used by a typical speech decoder implementing a typical speech coding standard for reconstructing far-end speech. The reconstructed speech waveforms are illustrated in FIG. 5. Certain prediction techniques use past information 421, as input, which is combined with current information 422 contained in the corresponding packet for the current frame N to generate the reconstructed speech 555 of the current frame N. The same process repeats on a frame by frame basis in a normal situation, as shown in the top portion of FIG. 4.

The bottom half of FIGS. 4 and 5 show what happens when a packet error occurs. When a packet is received in error 433, there is no new valid information for frame N+1, and the only possible way to reconstruct the far-end speech 565 is to rely solely on the past information to produce a so-called forced output speech signal 477/577 based entirely on prediction. In a normal conversation, speech signal characteristics, such as energy or frequency contents at any moment can change. But without a valid indication of the direction of the change, the safest and only possible prediction is to assume the signal is not changing, or alternatively is slowly changing with a bit of energy reduction in order to limit the impact to the user. With this approach, the predicted speech signal 577 can be quite different from the original far-end speech, resulting in objectionable speech quality degradation.

Wireless networks typically operate at around a 1% average packet loss rate. For good link conditions, the experienced loss rate can be very close to zero. In these conditions, there is no need for concern over voice quality degradation caused by this forced prediction technique to fill-in the rarely missing packets. But when the link quality deteriorates, the actual experienced packet loss rate by a user can be as high as 2-3% or more. Under such a poor link conditions, with a speech coding frame of 20 ms, the user will, in average, experience 1 to 2 forced prediction results per seconds. This translates into approximately 10 degraded/mismatched voice segments that will be heard in a single sentence that is about 5-7 seconds long. Needless to say, the conversation would be difficult under such conditions, if at all possible. It is also worth noting that under such conditions, the user would most certainly not be concerned about the mouth-to-ear latency, which as stated, effects only the interactivity of the call and not the quality of the voice signals themselves.

Figure 6:
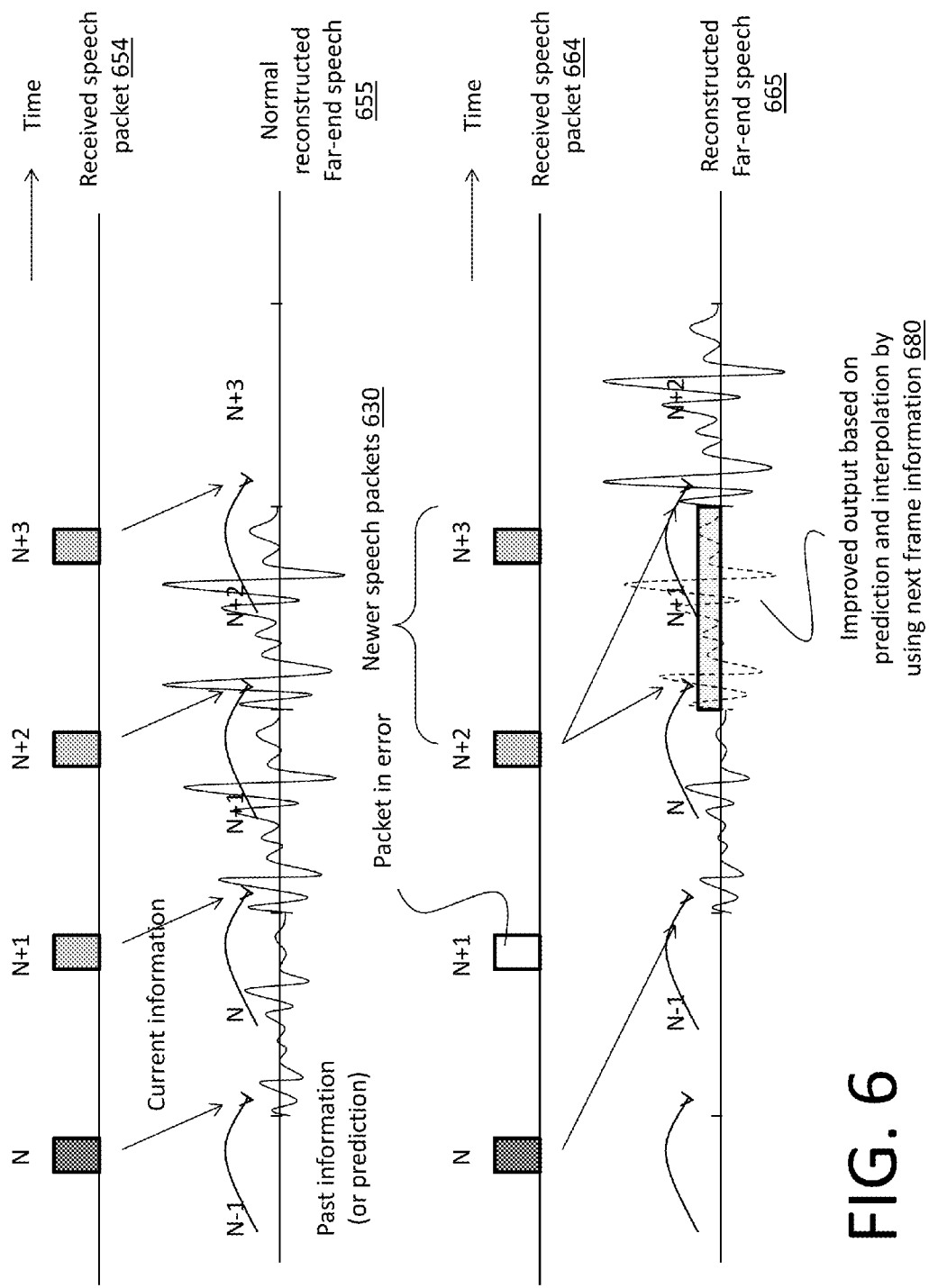
FIG. 6 illustrates the output of an exemplary improved error concealment technique in accordance with the present invention.

It is therefore, an objective of the present invention to improve the voice quality under higher than normal transmission loss conditions, by dynamically delaying the decoding process by one of more frames, to allow the decoder more time to receive additional and newer speech packets that are used to generate a much more accurate and matching far-end speech signal. FIG. 6 illustrates this aspect in one embodiment of the present invention.

Referring now to FIG. 6, when the decoding process is delayed by one frame in accordance with one embodiment of the present invention, the newer speech packet 630 for frame N+2 would have arrived before the speech decoder needs to output the speech samples for the frame N+1. The information contained in the packet N+2 can therefore be used to help the prediction process used by the decoder to generate the reconstructed far-end speech frame N+1 resulting in a significantly improved error concealment output 680.

Figure 7:
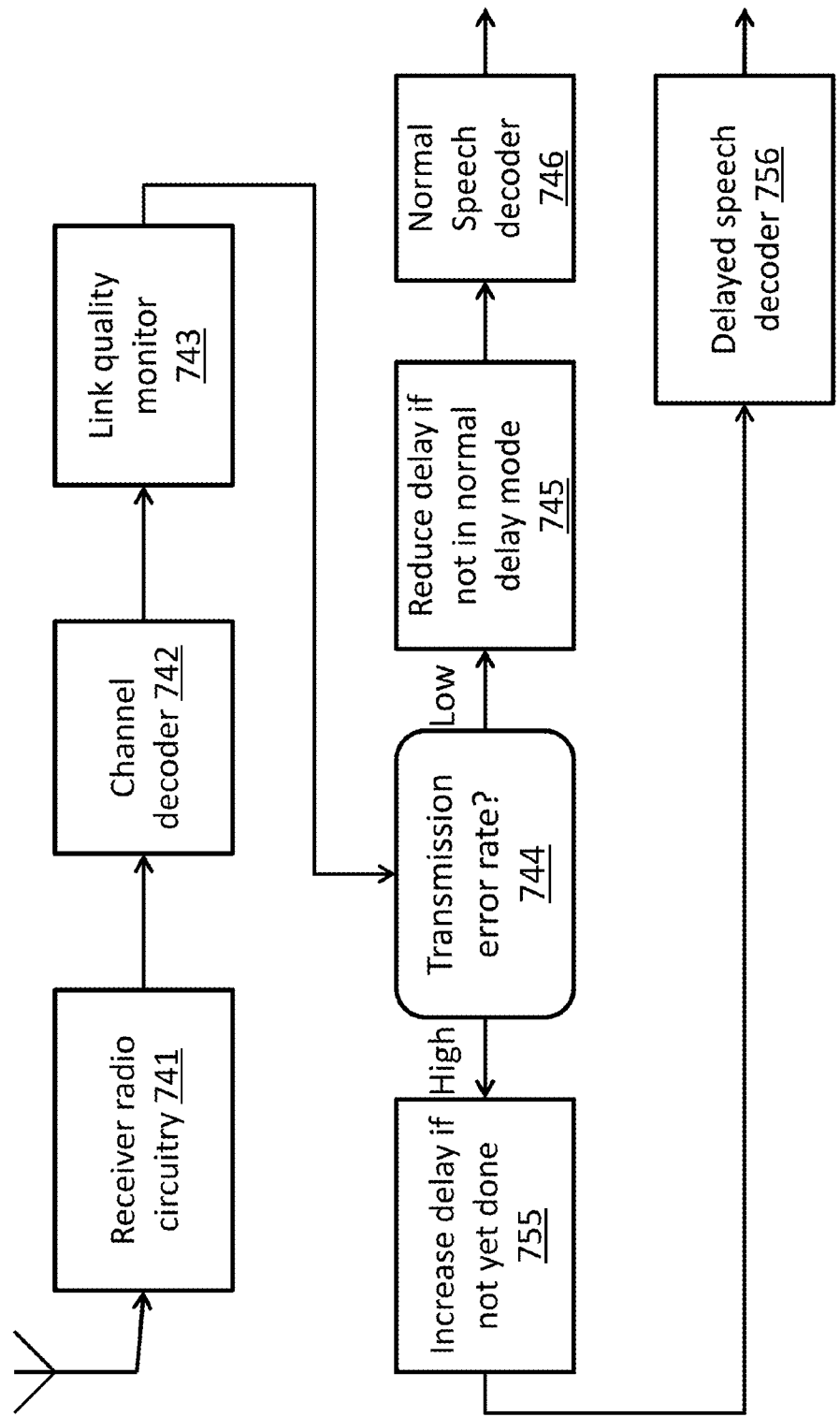
FIG. 7 depicts an illustrative flowchart of an improved speech receiver in a mobile phone in accordance with one embodiment of the present invention.

FIG. 7 shows an exemplary embodiment of the present invention implemented on the near-end phone. The receiver radio circuitry 741 sends speech signals to the channel decoder 742. A link quality monitor 743 is coupled to the channel decoder 742. The link quality monitor module 743 evaluates the link quality of the wireless network that the user is experiencing. For example, a simple link quality measurement can be based on calculating the packet loss rate over the past few seconds of received speech packets. In another embodiment of the present invention, more sophisticated link quality measurements can also be used, such as measuring the radio signal strength, channel decoder hard/soft link quality metrics, etc. Such link quality measurements are well known. It is worth noting that the link quality of a particular user has a strong time varying nature, it is therefore important to use a measurement that can represent the most recent trend of the radio link quality.

Once the measurement of the link quality is established, in one embodiment of the present invention depicted in FIG. 7, the link quality measurement is used to determine whether or not the user is likely to experience low transmission error, as shown in module 744. If it is determined that the user is likely to have low error rate, then the normal speech decoder 746 will continue to be used, or in the event that an increased delay decoding was previously being used, the delay adjustment module 745 reduces that delay back to normal. On the other hand, if it is determined that the user is likely to have high error rate, then extra delays are added to the signal processing flow 755 (if not done yet), and the delayed speech decoder 756 is used to reconstruct the far-end speech.

The delayed speech decoder 756 is a modified version of the standard decoder so that it can take advantage of the information contained in the newer speech packet(s) 630. One exemplary embodiment of the delayed speech decoder uses an interpolation technique to reconstruct the missing speech frame.

In order to minimize any negative impact, in the preferred method of the present invention, the delay adjustment modules 745/755 only make adjustments during silence or background noise periods of the far-end speech. The silence or background noise periods are either indicated by the VAD/DTX (voice activity detection, discontinuous transmission) mode of the wireless system, if they are turned on and being used, or can be detected by means of an VAD in the receiver or in a modified decoder. Again, such means to determine silence or background noise periods are well known.

Figure 8:
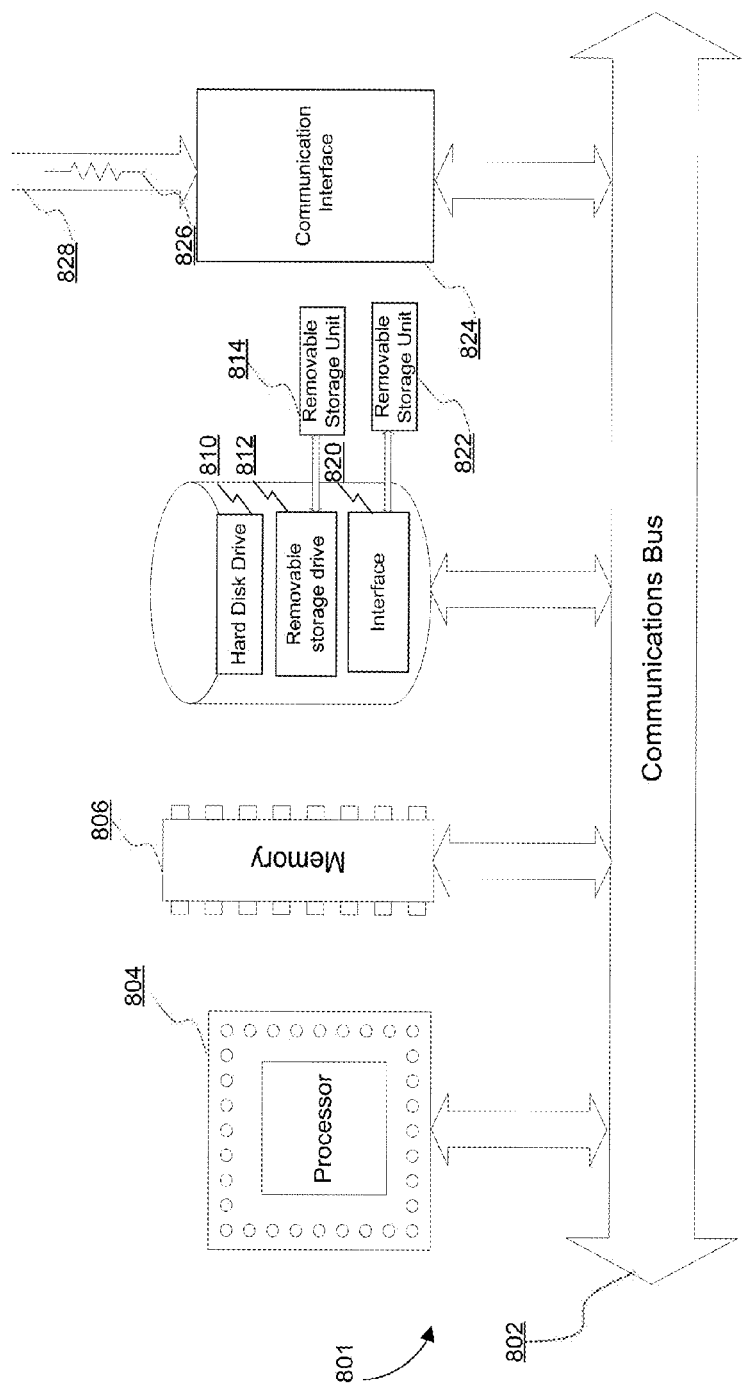
FIG. 8 illustrates a typical computer system capable of implementing an example embodiment of the present invention.

The present invention may be implemented using hardware, software or a combination thereof and may be implemented in a computer system or other processing system. Computers and other processing systems come in many forms, including wireless handsets, portable music players, infotainment devices, tablets, laptop computers, desktop computers and the like. In fact, in one embodiment, the invention is directed toward a computer system capable of carrying out the functionality described herein. An example computer system 801 is shown in FIG. 8. The computer system 801 includes one or more processors, such as processor 804. The processor 804 is connected to a communications bus 802. Various software embodiments are described in terms of this example computer system. After reading this description, it will become apparent to a person skilled in the relevant art how to implement the invention using other computer systems and/or computer architectures.

Computer system 801 also includes a main memory 806, preferably random access memory (RAM), and can also include a secondary memory 808. The secondary memory 808 can include, for example, a hard disk drive 810 and/or a removable storage drive 812, representing a magnetic disc or tape drive, an optical disk drive, etc. The removable storage drive 812 reads from and/or writes to a removable storage unit 814 in a well-known manner. Removable storage unit 814, represent magnetic or optical media, such as disks or tapes, etc., which is read by and written to by removable storage drive 812. As will be appreciated, the removable storage unit 814 includes a computer usable storage medium having stored therein computer software and/or data.

In alternative embodiments, secondary memory 808 may include other similar means for allowing computer programs or other instructions to be loaded into computer system 801. Such means can include, for example, a removable storage unit 822 and an interface 820. Examples of such can include a USB flash disc and interface, a program cartridge and cartridge interface (such as that found in video game devices), other types of removable memory chips and associated socket, such as SD memory and the like, and other removable storage units 822 and interfaces 820 which allow software and data to be transferred from the removable storage unit 822 to computer system 801.

Computer system 801 can also include a communications interface 824. Communications interface 824 allows software and data to be transferred between computer system 801 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link, such as WiFi or cellular, and other communications channels.

In this document, the terms "computer program medium" and "computer usable medium" are used to generally refer to media such as removable storage device 812, a hard disk installed in hard disk drive 810, and signals 826. These computer program products are means for providing software or code to computer system 801.

Computer programs (also called computer control logic or code) are stored in main memory and/or secondary memory 808. Computer programs can also be received via communications interface 824. Such computer programs, when executed, enable the computer system 801 to perform the features of the present invention as discussed herein. In particular, the computer programs, when executed, enable the processor 804 to perform the features of the present invention. Accordingly, such computer programs represent controllers of the computer system 801.

In an embodiment where the invention is implemented using software, the software may be stored in a computer program product and loaded into computer system 801 using removable storage drive 812, hard drive 810 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for improving the quality of a voice call transmitted over a cellular network through a cellular wireless link to a communication device having a voice decoder for generating reconstructed speech, the method comprising the steps of:
monitoring the cellular wireless link to determine a link quality;
receiving a voice packet from the cellular wireless link at the decoder;
determining if the voice decoder is a normal speech decoder or a delayed speech decoder;
if the voice decoder is said delayed speech decoder and said link quality is above a predetermined threshold, dynamically decreasing the latency of the voice call to generate a low-latency voice call by adjusting the voice decoder to said normal speech decoder during silence or background noise periods, and thereafter decoding the voice packet immediately; and
if the voice decoder is said normal speech decoder and said link quality is below said predetermined threshold, dynamically increasing the latency of the voice call to generate a high-latency voice call by adjusting the voice decoder to said delayed speech decoder during silence or background noise periods, and thereafter delaying the decoding process to perform at least one error correcting technique using newer information contained in speech packets received after a missing frame for increasing the quality of the reconstructed speech.

2. The method of claim 1, wherein said error correcting technique comprises reconstructing a missing speech frame using at least one prior correctly received speech packet.

3. The method of claim 1, wherein said error correcting technique comprises an interpolation technique for filling in a missing speech frame.

4. The method of claim 1, wherein the error correcting technique uses information from speech packets received both prior to and after a missing speech packet.

5. The method of claim 1, wherein the monitoring step comprises taking quality measurements based on a calculation of a packet loss rate over a period of time.

6. The method of claim 1, wherein the monitoring step comprises taking quality measurements by measuring the radio signal strength.

7. The method of claim 1, wherein the monitoring step comprises taking quality measurements by using channel decoder hard link quality metrics.

8. The method of claim 1, wherein the monitoring step comprises taking quality measurements by using channel decoder soft link quality metrics.

9. A system for improving the quality of a voice call transmitted over a cellular network through a cellular wireless link to a communication device having a voice decoder for generating reconstructed speech, the system comprising:
a link monitor for monitoring the cellular wireless link to determine a link quality;
a receiver for receiving a voice packet from the cellular wireless link;
a determination module coupled to the voice decoder for determining if the voice decoder is a normal speech decoder or a delayed speech decoder; and
an adjustment module, coupled to the voice decoder for:
dynamically decreasing the latency of the voice call to generate a low-latency voice call by adjusting the voice decoder to said normal speech decoder during silence or background noise periods and thereafter decoding the voice packet immediately, if the voice decoder is said delayed speech decoder and said link quality is above a predetermined threshold; and
dynamically increasing the latency of the voice call to generate a high-latency voice call by adjusting the voice coder to said delayed speech decoder during silence or background noise periods and thereafter delaying the decoding process to perform at least one error correcting technique using newer information contained in speech packets received after a missing frame, if the voice decoder is said normal speech decoder and said link quality is below said predetermined threshold.

10. The system of claim 9, wherein said error correcting technique comprises reconstructing a missing speech frame using at least one prior correctly received speech packet and another speech packet.

11. The system of claim 9, wherein said error correcting technique comprises an interpolation technique for filling in a missing speech frame.

12. The system of claim 9, wherein the link monitor takes quality measurements based on a calculation of a packet loss rate over a period of time.

13. The system of claim 9, wherein the link monitor takes quality measurements by measuring the radio signal strength.

14. The system of claim 9, wherein the link monitor takes quality measurements by channel decoder hard link quality metrics.

15. The system of claim 9, wherein the link monitor takes quality measurements by channel decoder soft link quality metrics.

16. A non-transitory computer program product comprising a computer useable medium having computer program logic stored therein, said computer program logic for enabling a computer processing device to improve the quality of a voice call transmitted over a cellular network through a cellular wireless link to a communication device having a voice decoder for generating reconstructed speech, the computer program product comprising:
code for monitoring the cellular wireless link to determine a link quality;

code for receiving a voice packet from the cellular wireless link at the decoder;

code for determining if the voice decoder is a normal speech decoder or a delayed speech decoder;

code for dynamically decreasing the latency of the voice call to generate a low-latency voice call by adjusting the voice decoder to said normal speech decoder during silence or background noise periods and thereafter decoding the voice packet immediately, if the voice decoder is said delayed speech decoder and said link quality is above a predetermined threshold; and code for dynamically increasing the latency of the voice call to generate a high-latency voice call by adjusting the voice decoder to said delayed speech decoder during silence or background noise periods and thereafter performing at least one error correcting technique using newer information contained in speech packets received after a missing frame for increasing the quality of the reconstructed speech, if the voice decoder is said normal speech decoder and said link quality is below said predetermined threshold.

17. The non-transitory computer program product of claim 16, wherein said error correcting technique comprises reconstructing a missing speech frame using at least one prior correctly received speech packet.

18. The non-transitory computer program product of claim 16, wherein said error correcting technique comprises an interpolation technique for filling in a missing speech frame.

19. The non-transitory computer program product of claim 16, wherein said monitoring code comprises code for taking quality measurements based on a calculation of a packet loss rate over a period of time.

20. The non-transitory computer program product of claim 16, wherein said monitoring code comprises taking quality measurements by measuring the radio signal strength.

21. The non-transitory computer program product of claim 16, wherein said monitoring code comprises code for taking quality measurements by channel decoder hard link quality metrics.

22. The non-transitory computer program product of claim 16, wherein said monitoring code comprises code for taking quality measurements by channel decoder soft link quality metrics.

* * * * *